Nov. 30, 1965   L. A. BEAUSOLEIL   3,220,272
SELF-CLEANING PULLEY
Filed Feb. 27, 1964
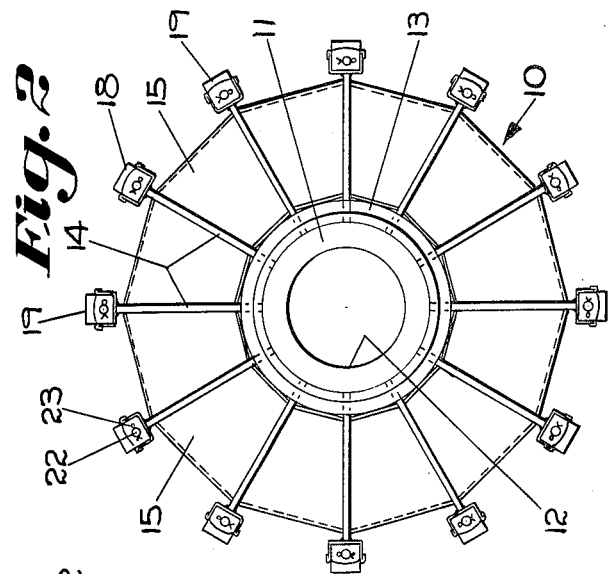
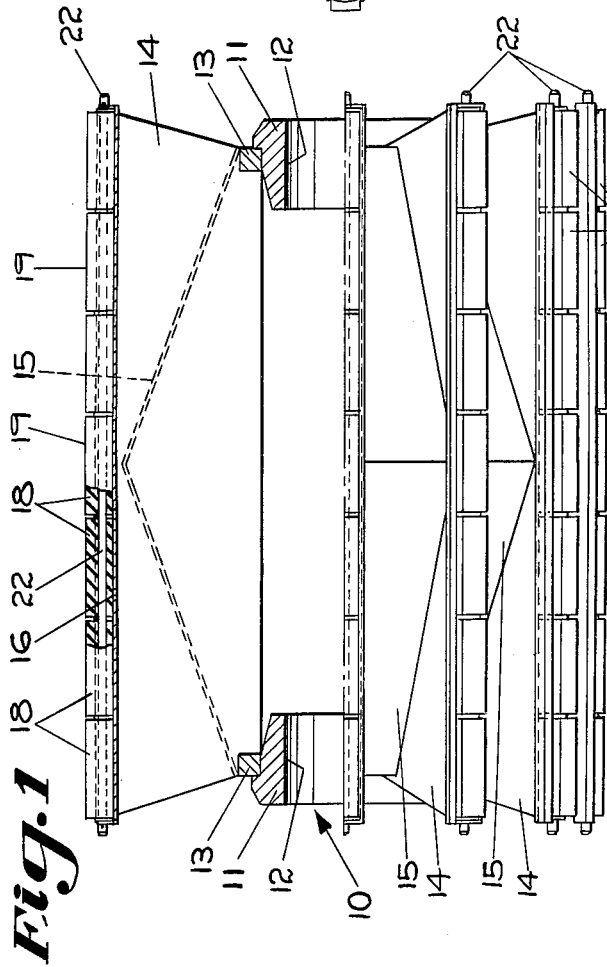
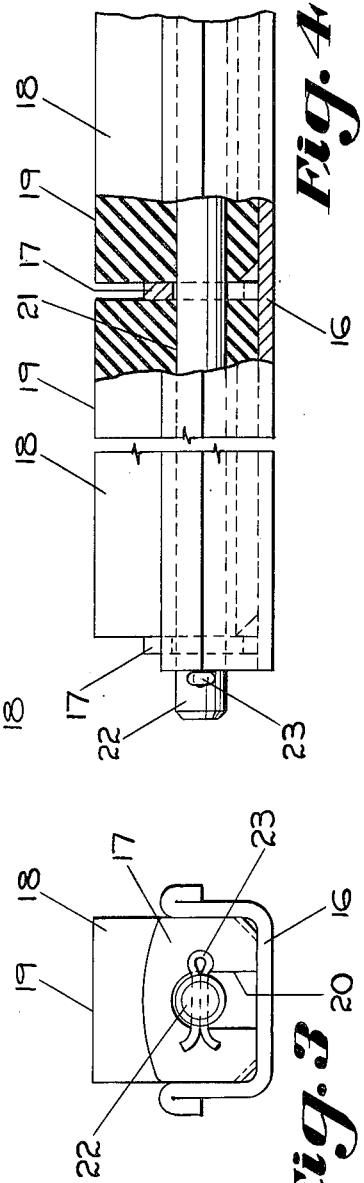
INVENTOR;
LEOPOLD A. BEAUSOLEIL,
BY David Young
ATT'Y.

3,220,272
SELF-CLEANING PULLEY
Leopold Armand Beausoleil, Montreal, Quebec, Canada, assignor to Jeffrey Galion Manufacturing Company, a corporation of Ohio
Filed Feb. 27, 1964, Ser. No. 347,751
8 Claims. (Cl. 74—230.6)

The instant invention is in an improved construction of a self-cleaning pulley.

It is an object of the instant invention to provide an improved construction of a self-cleaning pulley in which each of the slats comprises replaceable belt engaging elements.

It is a further object of the instant invention to provide an improved self-cleaning pulley in which the belt engaging elements are individual blocks which are releasably secured to the pulley to permit replacement thereof.

It is another object of the instant invention to provide an improved self-cleaning pulley construction including belt engaging blocks of uniform size.

It is still another object of the instant invention to provide an improved self-cleaning pulley comprising a plurality of individual yieldable blocks for engagement with a belt, or the like.

Still a further object of the instant invention is to provide an improved self-cleaning pulley construction in which each of the slats comprises a channel divided into separate compartments, each for the reception of a belt engaging block.

Other objects of the invention will appear hereinafter, the novel features and combinations being set forth in the appended claims.

In the drawings:

FIG. 1 is a longitudinal view, partially in section, of a self-cleaning pulley constructed in accordance with the instant invention;

FIG. 2 is an end elevational view of the self-cleaning pulley;

FIG. 3 is an end elevational view of one of the slats;

FIG. 4 is a longitudinal, elevational view, partially in section, of one of the slats.

Referring now to the drawings, particularly FIGS. 1 and 2, there is illustrated therein a self-cleaning pulley 10, constructed in accordance with the instant invention. The pulley 10 is adapted to be used for conveyor belts and the like, for example, at an end of a conveyor at which the belt is trained over the pulley 10 to reverse its direction. The self-cleaning pulley 10 has the inherent feature of preventing the collection and accumulation of materials on the pulley 10, which would affect the operation thereof, in that the pulley would not properly engage the belt and could cause damage to the belt. With the self-cleaning pulley construction, materials fall away from the pulley, thereby preventing the buildup of the same on the pulley, and assuring proper engagement of the pulley and belt and preventing damage to the latter.

The pulley 10 comprises a pair of hubs 11, 11 disposed at the opposite ends of the pulley, and each formed with a bore 12 for mounting the pulley on a shaft. An end ring 13 is mounted on each hub 11, 11. A plurality of radially extending arms 14 are secured to the end rings 13, 13, as by welding. Each radially extending arm 14 may be formed of plate material cut to the configuration illustrated in the drawings. In the illustrated embodiment of the invention, the pulley 10 includes twelve radially extending arms 14 disposed at equally spaced circumferential positions around the hubs 11, 11 and the end rings 13, 13. However, it will be understood that a greater or lesser number of radially extending arms 14 may be utilized, as may be deemed necessary.

Between adjacent radially extending arms 14, 14, there is provided a web 15 which has a peaked configuration, with the opposite sides of the web 15 sloping downwardly, from the longitudinal mid portion of the radially extending arms 14, 14 to the opposite end rings 13, 13. Such configuration causes the material to slide down over the webs 15 and to fall clear of the pulley 10 so as not to collect on the same; hence the self-cleaning action of the pulley 10. Each of the several webs 15 is secured in place to the radially extending arms 14, 14 and to the end rings 13, 13, as by welding. The several webs 15 also serve as structural elements rigidifying the pulley 10.

At the outer end of each radially extending arm 14 there is supported a slat comprising a longitudinally extending channel 16, which may be conveniently formed of sheet material, bent to the channel configuration, as illustrated in FIG. 3. The channel 16 is secured to an arm 14, as by welding. The channel 16 is divided into a plurality of compartments by a plurality of transverse partition walls 17, as best seen in FIGS. 3 and 4. The partition walls 17 are secured to the channel 16 in a suitable manner, for example as by welding, and the partition walls 17 are equally spaced so that the compartments formed thereby are of the same size. When each compartment formed by a channel 16 and the partition walls 17, there is placed a block 18 of yieldable material, which may be rubber. The several blocks 18 lie in an axially directed line and project beyond the channel 16 and the partition walls 17, whereby the outer surfaces 19 thereof determine the periphery of the pulley 10, and are the belt engaging surfaces of the pulley 10. Only the outer surfaces 19 of the several blocks 18 engage a belt. The outer surfaces 19 are flat; however, since the several blocks 18 are formed of yieldable material, the outer surfaces 19 will assume an arcuate configuration when in engagement with a belt, and when released from engagement with a belt, they will resume the flat configuration. Such yielding movement of the several blocks 18 serves to release any material that might otherwise stick to the blocks 18 and accumulate thereon. The materials which are released from the individual blocks 18 fall free of the pulley 10.

Each partition wall 17 is formed with a notch 20, the inner end of which is semi-circular, as seen in FIG. 3. In alignment with the ends of the notches 20, each of the blocks 18 is formed with an axially directed bore 21. The several blocks 18 are secured in a channel 16 by an axially extending rod 22, which is inserted through the several notches 20 and the several bores 21. At each end of the channel 16, a cotter pin 23, or like device, is inserted in the end of the rod 22 to secure it in the assembly. If any of the blocks 18 is worn out or damaged, it may be easily replaced, simply by removing the rod 22. The blocks 18 are of the same size as the compartments of the channel 16, so that the blocks 18 may be readily and freely placed in the individual compartments, and removed from the same. The rod 22 secures the blocks 18 in place.

In the pulley 10, the blocks 18 are all of the same size, which requires the stocking of only one size block for replacement purposes. Likewise, pulleys of various sizes may be constructed, all of which utilize blocks 18 of the same size, again reducing the stocking requirements of blocks for replacement purposes.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A pulley construction in which the periphery of the pulley comprises a plurality of circumferentially spaced slats for engagement with a belt or the like, each slat including several blocks disposed in an axial line, an element extending in an axial direction through the several blocks to secure the blocks to the pulley, and releasable means securing said axially extending element to the pulley to permit said element to be removed for replacement of said blocks.

2. A pulley construction as recited in claim 1, said blocks being formed of yieldable material, and each block having a flat surface facing outwardly of the pulley.

3. A pulley construction as recited in claim 1, said blocks each having a bore extending in an axial direction through the block, and said axially extending element comprising a rod extending through the bores of said blocks of a slat.

4. A pulley construction as recited in claim 1, each slat including a channel extending in an axial direction, said blocks being received in the channel with a portion of each block projecting radially from the channel to engage a belt or the like freely of the channel.

5. A pulley construction in which the periphery of the pulley comprises a plurality of circumferentially spaced slats for engagement with a belt or the like, each slat including an outwardly facing channel extending in an axial direction, several blocks disposed in said channel in an axial line, said channel having several discrete compartments each for the reception of a block, said blocks projecting from the channel to engage a belt or the like, an element extending in an axial direction through the several blocks in a channel to secure the blocks in the several compartments of the channel, releasable means securing said axially extending element to the channel to permit said element to be removed for replacement of said blocks.

6. A pulley construction as recited in claim 5, said channel having a plurality of axially spaced transverse walls forming said discrete compartments, and at least that portion of each block that is received in a compartment being substantially the same size as the compartment to be freely received therein.

7. A pulley construction as recited in claim 6, said axially extending element comprising a rod extending through the blocks and through the transverse walls of a channel.

8. A pulley construction in which the periphery of the pulley comprises a plurality of circumferentially spaced slats for engagement with a belt or the like, each slat including an outwardly facing channel disposed in an axial direction, a radially disposed arm supporting the channel at the periphery of the pulley, a plurality of axially spaced transverse walls forming said channel with several compartments, a block disposed in each compartment and projecting therefrom beyond the channel to engage a belt or the like, a rod extending in an axial direction through the several blocks and transverse walls in a channel to secure the blocks in the compartments of the channel.

References Cited by the Examiner
UNITED STATES PATENTS

| 1,196,922 | 9/1916 | Black | 74—230.6 |
| 1,275,670 | 8/1918 | Fry et al. | 74—230.6 |
| 1,691,993 | 11/1928 | Rogers | 74—230.6 |
| 2,232,623 | 2/1941 | Neuman | 74—230.6 |
| 3,046,805 | 7/1962 | Van Gorp | 74—230.7 |

DON A. WAITE, *Primary Examiner.*
JAMES A. WONG, *Examiner.*